(12) United States Patent
Koskulics et al.

(10) Patent No.: US 12,129,709 B2
(45) Date of Patent: Oct. 29, 2024

(54) CONTROL CIRCUITRY FOR DYNAMIC SHADE WITH ELECTROSTATIC HOLDING, AND/OR ASSOCIATED METHODS

(71) Applicant: GUARDIAN GLASS, LLC, Auburn, MI (US)

(72) Inventors: Jeffrey Koskulics, Auburn Hills, MI (US); Uzair Ahmed, Auburn Hills, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 943 days.

(21) Appl. No.: 16/947,014

(22) Filed: Jul. 15, 2020

(65) Prior Publication Data

US 2022/0018181 A1 Jan. 20, 2022

(51) Int. Cl.
*E06B 9/40* (2006.01)
*H01F 38/42* (2006.01)
(Continued)

(52) U.S. Cl.
CPC ............... *E06B 9/40* (2013.01); *H01F 38/42* (2013.01); *H02M 3/33507* (2013.01); *E06B 9/264* (2013.01); *E06B 2009/2643* (2013.01)

(58) Field of Classification Search
CPC .. E06B 9/40; E06B 2009/402; E06B 2009/40; E06B 9/264; E06B 2009/2643;
(Continued)

(56) References Cited

U.S. PATENT DOCUMENTS 2,311,406 A 2/1943 Mansfield
3,236,290 A 2/1966 Holger
(Continued)

FOREIGN PATENT DOCUMENTS

CN 103042781 A 4/2013
CN 103620490 A 3/2014
(Continued)

OTHER PUBLICATIONS

International Search Report and Written Opinion received for PCT Application No. PCT/IB2021/056376, mailed on Nov. 8, 2021, 10 Pages.
(Continued)

*Primary Examiner* — Beth A Stephan (57) ABSTRACT

Certain example embodiments relate to circuitry for controlling dynamic shades and/or associated methods. An insulating glass (IG) unit includes a spacer system helping to maintain first and second substrates in substantially parallel spaced apart relation to one another and to define a gap therebetween. The shade is interposed between the first and second substrates. It includes a first conductive layer provided on the interior major surface of the first substrate; and a shutter including at least one polymer substrate, first and second conductive coatings, and first and second dielectric layers. The at least one polymer substrate is extendible to a shutter closed position and retractable to a shutter open position. A control circuit includes a boosting transformer (e.g., a flyback transformer) coupled to a power source and the shade, with the boosting transformer being controllable to produce a voltage for charging the shade and to discharge accumulated shade capacitance.

26 Claims, 4 Drawing Sheets

(51) Int. Cl.
*H02M 3/335* (2006.01)
*E06B 9/264* (2006.01)

(58) Field of Classification Search
CPC ............ E06B 2009/2646; H01F 38/42; H02M 3/33507; H02M 3/33515
See application file for complete search history.

(56) References Cited

U.S. PATENT DOCUMENTS

| | | | |
|---|---|---|---|
| 3,897,997 A | 8/1975 | Kalt | |
| 3,989,357 A | 11/1976 | Kalt | |
| 4,094,590 A | 6/1978 | Kalt | |
| 4,105,294 A | 8/1978 | Peck | |
| 4,208,103 A | 6/1980 | Kalt | |
| 4,248,501 A | 2/1981 | Simpson | |
| 4,266,339 A | 5/1981 | Kalt | |
| 4,336,536 A | 6/1982 | Kalt | |
| 4,383,255 A | 5/1983 | Grandjean | |
| 4,468,663 A | 8/1984 | Kalt | |
| 4,488,784 A | 12/1984 | Kalt | |
| 4,695,837 A | 9/1987 | Kalt | |
| 4,747,670 A | 5/1988 | Devio | |
| 4,788,089 A | 11/1988 | Skipper | |
| 4,865,107 A * | 9/1989 | Dube | E06B 9/40 160/264 |
| 4,915,486 A | 4/1990 | Hansen | |
| 4,978,952 A | 12/1990 | Irwin | |
| 5,231,559 A | 7/1993 | Kalt | |
| 5,519,565 A | 5/1996 | Kalt | |
| 5,554,434 A | 9/1996 | Park | |
| 5,629,790 A | 5/1997 | Neukermans | |
| 5,638,084 A | 6/1997 | Kalt | |
| 6,075,639 A | 6/2000 | Kino | |
| 6,081,304 A | 6/2000 | Kuriyama | |
| 6,229,509 B1 | 5/2001 | Deluca | |
| 6,467,935 B1 | 10/2002 | Schwab | |
| 6,557,279 B2 | 5/2003 | Araki | |
| 6,692,646 B2 | 2/2004 | Kalt | |
| 6,771,237 B1 | 8/2004 | Kalt | |
| 6,887,575 B2 | 5/2005 | Neuman et al. | |
| 6,897,786 B1 | 5/2005 | Kalt | |
| 6,972,888 B2 | 12/2005 | Poll | |
| 7,056,588 B2 | 6/2006 | Neuman et al. | |
| 7,085,609 B2 | 8/2006 | Bechtel | |
| 7,189,458 B2 | 3/2007 | Ferreira et al. | |
| 7,198,851 B2 | 4/2007 | Lemmer et al. | |
| 7,645,977 B2 | 1/2010 | Schlam et al. | |
| 7,705,826 B2 | 4/2010 | Kalt et al. | |
| 7,771,830 B2 | 8/2010 | Neuman et al. | |
| 7,998,320 B2 | 8/2011 | Laird et al. | |
| 8,035,075 B2 | 10/2011 | Schlam | |
| 8,134,112 B2 | 3/2012 | Schlam et al. | |
| 8,557,391 B2 | 10/2013 | Frank et al. | |
| 8,668,990 B2 | 3/2014 | Broadway et al. | |
| 8,736,938 B1 | 5/2014 | Schlam et al. | |
| 8,925,286 B2 | 1/2015 | Hagen | |
| 8,982,441 B2 | 3/2015 | Schlam et al. | |
| 9,229,291 B2 | 1/2016 | Kailasam et al. | |
| 9,556,066 B2 | 1/2017 | Frank et al. | |
| 9,670,092 B2 | 6/2017 | Lemmer et al. | |
| 9,695,085 B2 | 7/2017 | Lemmer et al. | |
| 9,796,619 B2 | 10/2017 | Broadway et al. | |
| 9,802,860 B2 | 10/2017 | Frank et al. | |
| 10,162,240 B2 | 12/2018 | Rozbicki | |
| 10,288,969 B2 | 5/2019 | Kailasam et al. | |
| 10,676,990 B2 * | 6/2020 | Delvecchio | B60J 1/2025 |
| 10,788,723 B2 | 9/2020 | Rozbicki et al. | |
| 10,801,258 B2 | 10/2020 | Krasnov et al. | |
| 10,831,077 B2 | 11/2020 | Kailasam et al. | |
| 10,871,027 B2 | 12/2020 | Petrmichl et al. | |
| 10,895,102 B2 | 1/2021 | Frey et al. | |
| 10,914,114 B2 | 2/2021 | Blush et al. | |
| 10,927,592 B2 | 2/2021 | Blush et al. | |
| 11,174,676 B2 | 11/2021 | Gu | |
| 2002/0144831 A1 | 10/2002 | Kalt | |
| 2004/0001033 A1 | 1/2004 | Goodwin-johansson | |
| 2004/0046123 A1 | 3/2004 | Dausch | |
| 2010/0290101 A1 | 11/2010 | Kim | |
| 2013/0188235 A1 | 7/2013 | Floyd | |
| 2014/0268296 A1 * | 9/2014 | Schlam | E06B 3/00 359/290 |
| 2014/0272314 A1 | 9/2014 | Veerasamy | |
| 2014/0338846 A1 | 11/2014 | Hikmet et al. | |
| 2017/0184221 A1 | 6/2017 | Mcnamara et al. | |
| 2017/0238401 A1 * | 8/2017 | Sadwick | H05B 45/395 315/294 |
| 2019/0024452 A1 | 1/2019 | Derk, Jr. | |
| 2020/0011120 A1 | 1/2020 | Blush et al. | |
| 2021/0238913 A1 | 8/2021 | Koskulics | |
| 2021/0254397 A1 | 8/2021 | Gu et al. | |
| 2022/0018181 A1 | 1/2022 | Koskulics et al. | |

FOREIGN PATENT DOCUMENTS

| | | |
|---|---|---|
| CN | 105182569 A | 12/2015 |
| EP | 1241507 A2 | 9/2002 |
| JP | H10249278 A | 9/1998 |
| JP | 2005089643 A | 4/2005 |
| KR | 20090008928 A | 1/2009 |
| KR | 20130011845 A | 1/2013 |
| WO | 9857318 A2 | 12/1998 |
| WO | 2013030712 A1 | 3/2013 |
| WO | 2018138015 A1 | 8/2018 |
| WO | 2018138105 A1 | 8/2018 |
| WO | 2020008434 A1 | 1/2020 |
| WO | 2020008438 A1 | 1/2020 |

OTHER PUBLICATIONS

U.S. Appl. No. 16/779,927, filed Feb. 3, 2020; Koskulics.
Linear Technology—Photoflash Capacitor Chargers LT3484-0/ LT3484-1 /LT3484-2, retrieved May 26, 2020, 12 pages. https:// www.analog.com/media/en/technical-documentation/data-sheets/ 3484012f.pdf.
International Search Report and Written Opinion received for PCT Application No. PCT/IB2021/050867, mailed on May 21, 2021, 10 Pages.
International Search Report and Written Opinion received for PCT Application No. PCT/IB2021/050870, mailed on May 19, 2021, 10 Pages.
International Search Report and Written Opinion received for PCT Application No. PCT/IB2021/051326, mailed on May 27, 2021, 12 pages.
International Search Report and Written Opinion received for PCT Application No. PCT/IB2021/062199, mailed on Apr. 20, 2022, 12 Pages.
Notice of Allowance received for U.S. Appl. No. 16/779,990, mailed on Aug. 6, 2021, 09 Pages.
U.S. Appl. No. 16/779,990, filed Feb. 3, 2020; Yabei Gu.
U.S. Appl. No. 16/792,348, filed Feb. 17, 2020; Yabei Gu et al.
U.S. Appl. No. 17/861,388, filed Jul. 11, 2022, Petrmichl et al.

* cited by examiner

CONTROL CIRCUITRY FOR DYNAMIC SHADE WITH ELECTROSTATIC HOLDING, AND/OR ASSOCIATED METHODS

TECHNICAL FIELD

Certain example embodiments of this invention relate to shades that may be used with insulating glass units (IG units or IGUs), IG units including such shades, and/or methods of making the same. More particularly, certain example embodiments of this invention relate to motor-driven shades that may be used with IG units, IG units including such shades, and/or methods of making the same.

BACKGROUND AND SUMMARY

The building sector is known for its high energy consumption, which has been shown to represent 30-40% of the world's primary energy expenditure. Operational costs, such as heating, cooling, ventilation, and lighting account for the better part of this consumption, especially in older structures built under less stringent energy efficiency construction standards.

Windows, for example, provide natural light, fresh air, access, and connection to the outside world. However, they oftentimes also represent a significant source of wasted energy. With the growing trend in increasing the use of architectural windows, balancing the conflicting interests of energy efficiency and human comfort is becoming more and more important. Furthermore, concerns with global warming and carbon footprints are adding to the impetus for novel energy efficient glazing systems.

In this regard, because windows are usually the "weak link" in a building's isolation, and considering modern architectural designs that often include whole glass facades, it becomes apparent that having better insulating windows would be advantageous in terms of controlling and reducing energy waste. There are, therefore, significant advantages both environmentally and economically in developing highly insulating windows.

Figure 1:
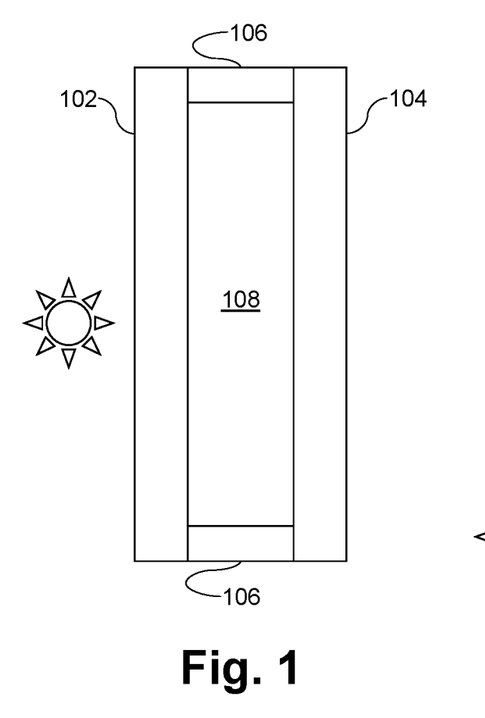
FIG. 1 is a cross-sectional, schematic view of an example insulating glass unit (IG unit or IGU)

Insulating glass units (IG units or IGUs) have been developed and provide improved insulation to buildings and other structures, and FIG. 1 is a cross-sectional, schematic view of an example IG unit. In the FIG. 1 example IG unit, first and second substrates 102 and 104 are substantially parallel and spaced apart from one another. A spacer system 106 is provided at the periphery of the first and second substrates 102 and 104, helping to maintain them in substantially parallel spaced apart relation to one another and helping to define a gap or space 108 therebetween. The gap 108 may be at least partially filled with an inert gas (such as, for example, Ar, Kr, Xe, and/or the like) in some instances, e.g., to improve the insulating properties of the overall IG unit. Optional outer seals may be provided in addition to the spacer system 106 in some instances.

Windows are unique elements in most buildings in that they have the ability to "supply" energy to the building in the form of winter solar gain and daylight year around. Current window technology, however, often leads to excessive heating costs in winter, excessive cooling in summer, and often fails to capture the benefits of daylight, that would allow lights to be dimmed or turned off in much of the nation's commercial stock.

Thin film technology is one promising way of improving window performance. Thin films can, for example, be applied directly onto glass during production, on a polymer web that can be retrofitted to an already pre-existing window at correspondingly lower cost, etc. And advances have been made over the last two decades, primarily in reducing the U-value of windows through the use of static or "passive" low-emissivity (low-E) coatings, and by reducing the solar heat gain coefficient (SHGC) via the use of spectrally selective low-E coatings. Low-E coatings may, for example, be used in connection with IG units such as, for example, those shown in and described in connection with FIG. 1. However, further enhancements are still possible.

For instance, it will be appreciated that it would be desirable to provide a more dynamic IG unit option that takes into account the desire to provide improved insulation to buildings and the like, takes advantage of the ability of the sun to "supply" energy to its interior, and that also provides privacy in a more "on demand" manner. It will be appreciated that it would be desirable for such products to have a pleasing aesthetic appearance, as well.

Certain example embodiments address these and/or other concerns. For instance, certain example embodiments of this invention relate to electric, potentially-driven shades that may be used with IG units, IG units including such shades, and/or methods of making the same.

In certain example embodiments, an insulating glass (IG) unit is provided. First and second substrates each have interior and exterior major surfaces, the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates, the shade including: a first conductive layer provided, directly or indirectly, on the interior major surface of the first substrate; and a shutter including at least one polymer substrate, first and second conductive coatings, and first and second dielectric layers. The at least one polymer substrate is extendible to a shutter closed position and retractable to a shutter open position. A control circuit includes a boosting transformer (e.g., a flyback transformer) coupled to a power source and the shade, the boosting transformer being controllable to produce a voltage for charging the shade and to discharge accumulated shade capacitance.

In certain example embodiments, there is provided a method of controlling a shade, the method comprising: having an insulating glass (IG) unit. The IG unit comprises first and second substrates, each having interior and exterior major surfaces, the interior major surface of the first substrate facing the interior major surface of the second substrate; and a spacer system helping to maintain the first and second substrates in substantially parallel spaced apart relation to one another and to define a gap therebetween. The shade is dynamically controllable and interposed between the first and second substrates, with the shade including: a first conductive layer provided, directly or indirectly, on the interior major surface of the first substrate; and a shutter including at least one polymer substrate, first and second conductive coatings, and first and second dielectric layers. The at least one polymer substrate is extendible to a shutter closed position and retractable to a shutter open position. The IG unit also includes a control circuit including a boosting transformer (e.g., a flyback transformer) coupled to a power source and the shade, with the boosting transformer being controllable to produce a voltage for charging the shade and to discharge accumulated shade capacitance. Electrostatic forces are created via the control circuit to drive the shade to the shutter closed position.

In certain example embodiments, a method of operating a dynamic shade in an insulating glass (IG) unit is provided. The method comprises having an IG unit made in accordance with the techniques disclosed herein; and selectively activating the power source to move the polymer substrate between the shutter open and closed positions. In certain example embodiments, a method of making an IGU is provided. Certain example embodiments contemplate the control circuitry alone being made and/or used.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 2:
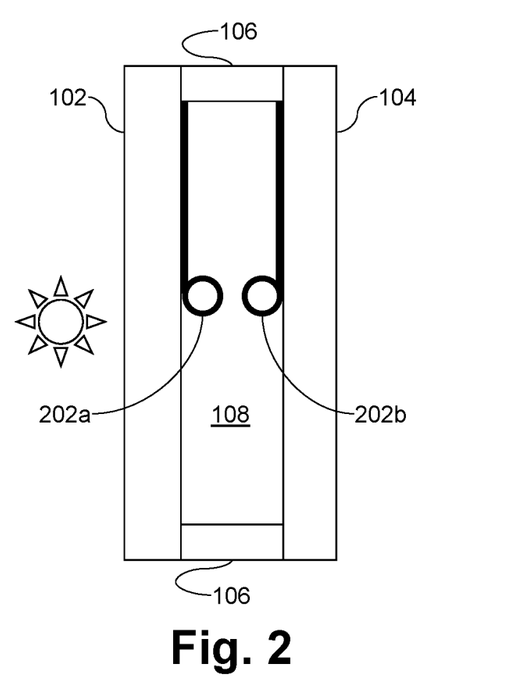
FIG. 2 is a cross-sectional, schematic view of an example IGU incorporating electric potentially-driven shades that may be used in connection with certain example embodiments.

Certain example embodiments of this invention relate to electric, potentially-driven shades that may be used with IG units, IG units including such shades, and/or methods of making the same. Referring now more particularly to the drawings, FIG. 2 is a cross-sectional, schematic view of an example insulating glass unit (IG unit or IGU) incorporating electric potentially-driven shades that may be used in connection with certain example embodiments. More specifically, FIG. 2 is similar to FIG. 1 in that first and second substantially parallel spaced apart glass substrates 102 and 104 are separated from one another using a spacer system 106, and a gap 108 is defined therebetween. First and second electric potentially-driven shades 202a and 202b are provided in the gap 108, proximate to inner major surfaces of the first and second substrates 102 and 104, respectively. As will become clearer from the description provided below, the shades 202a and 202b are controlled by the creation of an electric potential difference between the shades 202a and 202b, and conductive coatings formed on the inner surfaces of the substrates 102 and 104. As also will become clearer from the description provided below, each of shades 202a and 202b may be created using a polymer film coated with a conductive coating (e.g., a coating comprising a layer including Al, Cr, ITO, and/or the like). An aluminum-coated shade may provide for partial-to-complete reflection of visible light, and up to significant amounts of total solar energy.

The shades 202a and 202b are normally retracted (e.g., rolled up), but they rapidly extend (e.g., roll out) when an appropriate voltage is applied, in order to cover at least a portion of the substrates 102 and 104 much like, for example, a "traditional" window shade. The rolled-up shade may have a very small diameter, and typically will be much smaller than the width of the gap 108 between the first and second substrates 102 and 104, so that it can function between them and be essentially hidden from view when rolled up. The rolled-out shades 202a and 202b adhere strongly to the adjacent substrates 102 and 104.

The shades 202a and 202b extend along all or a portion of a vertical length of the visible or "framed" area of the substrates 102 and 104 from a retracted configuration to an extended configuration. In the retracted configuration, the shades 202a and 202b have a first surface area that substantially permits radiation transmission through the framed area. In the extended configuration, the shades 202a and 202b have a second surface area that substantially controls radiation transmission through the framed area. The shades 202a and 202b may have a width that extends across all or a portion of the horizontal width of the framed area of the substrates 102 and 104 to which they are attached.

Each of the shades 202a and 202b is disposed between the first and second substrates 102 and 104, and each preferably is attached at one end to an inner surface thereof (or a dielectric or other layer disposed thereon), near the tops thereof. An adhesive layer may be used in this regard. The shades 202 and 204 are shown partially rolled out (partially extended) in FIG. 2. The shades 202a and 202b and any adhesive layer or other mounting structure preferably are hidden from view so that the shades 202a and 202b are only seen when at least partially rolled out.

The diameter of a fully rolled-up shade preferably is about 1-5 mm but may be greater than 5 mm in certain example embodiments. Preferably, the diameter of a rolled-up shade is no greater than the width of the gap 108, which is typically about 10-15 mm, in order to help facilitate rapid and repeated roll-out and roll-up operations. Although two shades 202a and 202b are shown in the FIG. 2 example, it will be appreciated that only one shade may be provided in certain example embodiments, and it also will be appreciated that that one shade may be provided on an inner surface of either the inner or outer substrate 102 or 104. In example embodiments where there are two shades, the combined diameter thereof preferably is no greater than the width of the gap 108, e.g., to facilitate roll-out and roll-up operations of both shades.

An electronic controller may be provided to help drive the shades 202a and 202b. The electronic controller may be electrically connected to the shades 202a and 202b, as well as the substrates 102 and 104, e.g., via suitable leads or the like. The leads may be obscured from view through the assembled IG unit. The electronic controller is configured to provide an output voltage to the shades 202a and 202b. Output voltage in the range of about 100-800 V DC (e.g., 100-500 V DC or 300-800 V DC) can be used for driving the shades 202a and 202b in certain example embodiments. An external AC or DC power supply, a DC battery, and/or the like may be used in this regard. It will be appreciated that higher or lower output voltage may be provided, e.g., depending on the fabrication parameters and materials that comprise the shades 202a and 202b, the layers on the substrates 102 and 104, etc.

The controller may be coupled to a manual switch, remote (e.g., wireless) control, or other input device, e.g., to indicate whether the shades 202a and 202b should be retracted or extended. In certain example embodiments, the electronic controller may include a processor operably coupled to a memory storing instructions for receiving and decoding control signals that, in turn, cause voltage to be selectively applied to control the extension and/or retraction of the shades 202a and 202b. Further instructions may be provided so that other functionality may be realized. For instance, a timer may be provided so that the shades 202a and 202b can be programmed to extend and retract at user-specified or other times, a temperature sensor may be provided so that the shades 202a and 202b can be programmed to extend and retract if user-specified indoor and/or outdoor temperatures are reached, light sensors may be provided so that the shades 202a and 202b can be programmed to extend and retract based on the amount of light outside of the structure, etc.

Although two shades 202a and 202b are shown in FIG. 2, as noted above, certain example embodiments may incorporate only a single shade. Furthermore, as noted above, such shades may be designed to extend vertically and horizontally along and across substantially the entire IG unit, different example embodiments may involve shades that cover only portions of the IG units in which they are disposed. In such cases, multiple shades may be provided to deliver more selectable coverage, to account for internal or external structures such as muntin bars, to simulate plantation shutters, etc.

In certain example embodiments, a locking restraint may be disposed at the bottom of the IGU, e.g., along its width, to help prevent the shades from rolling out their entire lengths. The locking restraint may be made from a conductive material, such as a metal or the like. The locking restraint also may be coated with a low dissipation factor polymer such as, for example, polypropylene, fluorinated ethylene propylene (FEP), polytetrafluoroethylene (PTFE), and/or the like.

Figure 3:
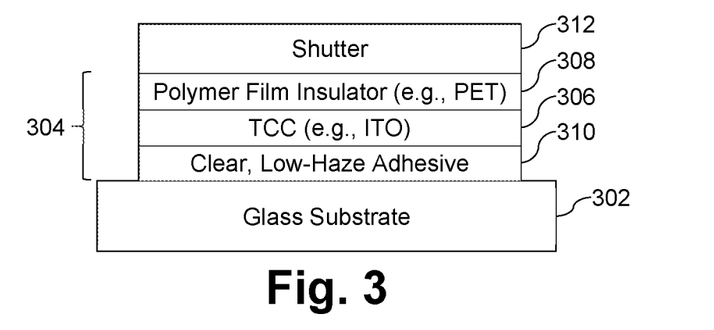
FIG. 3 is a cross-sectional view showing example on-glass components from the FIG. 2 example IGU that enable shutter action, in accordance with certain example embodiments.
Figure 4:
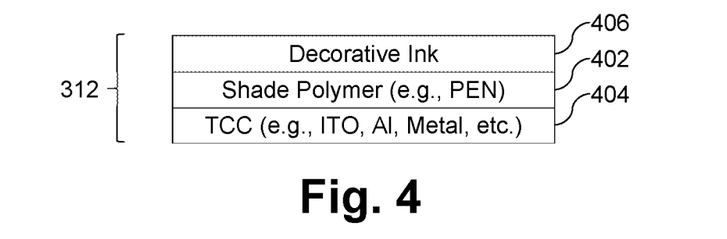
FIG. 4 is a cross-sectional view of an example shutter from the FIG. 2 example IGU, in accordance with certain example embodiments.

Example details of the operation of the shades 202a and 202b will now be provided in connection with FIGS. 3-4. More particularly, FIG. 3 is a cross-sectional view showing example on-glass" components from the FIG. 2 example IGU that enable shutter action, in accordance with certain example embodiments; and FIG. 4 is a cross-sectional view of an example shutter from the FIG. 2 example IGU, in accordance with certain example embodiments. FIG. 3 shows a glass substrate 302, which may be used for either or both of the substrates 102 and 104 in FIG. 2. The glass substrate 302 supports on-glass components 304, as well as the shutter 312. In certain example embodiments, when unrolled, the conductor 404 may be closer to the substrate 302 than the ink layer 406. In other example embodiments, this arrangement may be reversed such that, for example, when unrolled, the conductor 404 may be farther from the substrate 302 than the ink layer 406.

The on-glass components 304 include a transparent conductor 306, along with a dielectric material 308, which may be adhered to the substrate 302 via a clear, low-haze adhesive 310 or the like. These materials preferably are substantially transparent. In certain example embodiments, the transparent conductor 306 is electrically connected via a terminal to a lead to the controller. In certain example embodiments, the transparent conductor 306 serves as a fixed electrode of a capacitor, and the dielectric material 308 serves as the dielectric of this capacitor. In such cases, a dielectric or insulator film is provided, directly or indirectly, on the first conductive layer, with the dielectric or insulator film being separate from the shutter.

It will be appreciated that it is possible to put all of the dielectric layers on the shade in certain example embodiments, thereby exposing a bare conductive (flat) substrate, e.g., a glass substrate supporting a conductive coating. For example, in certain example embodiments, the polymer film insulator 308 may be provided on/integrated as a part of the shutter 312, rather than being provided on/integrated as a part of the substrate 302. That is, the shutter 312 may further support a dielectric or insulator film 308 thereon such that, when the at least one polymer substrate is in the shutter closed position and the shutter is extended, the dielectric or insulator film directly physically contacts the first conductive layer with no other layers therebetween.

The transparent conductor 306 may be formed from any suitable material such as, for example, ITO, tin oxide (e.g., $SnO_2$ or other suitable stoichiometry), etc. The transparent conductor 306 may be 10-500 nm thick in certain example embodiments. The dielectric material 308 may be a low dissipation factor polymer in certain example embodiments. Suitable materials include, for example, polypropylene, FEP, PTFE, polyethyleneterephthalate (PET), polyimide (PI), and polyethylenenapthalate (PEN), etc. The dielectric material 308 may have a thickness of 4-25 microns in certain example embodiments. The thickness of the dielectric material 308 may be selected so as to balance reliability of the shade with the amount of voltage (e.g., as thinner dielectric layers typically reduce reliability, whereas thicker dielectric layers typically require a high applied voltage for operational purposes).

As is known, many low-emissivity (low-E) coatings are conductive. Thus, in certain example embodiments, a low-E coating may be used in place of the transparent conductor 306 in certain example embodiments. The low-E coating may be a silver-based low-E coating, e.g., where one, two, three, or more layers comprising Ag may be sandwiched between dielectric layers. In such cases, the need for the adhesive 310 may be reduced or completely eliminated.

The shutter 312 may include a resilient layer 402. In certain example embodiments, a conductor 404 may be used on one side of the resilient layer 402, and a decorative ink 406 optionally may be applied to the other side. In certain example embodiments, the conductor 404 may be transparent and, as indicated, the decorative ink 406 is optional. In certain example embodiments, the conductor 404 and/or the decorative ink 406 may be translucent or otherwise impart coloration or aesthetic features to the shutter 312. In certain example embodiments, the resilient layer 402 may be formed from a shrinkable polymer such as, for example, PEN, PET, polyphenylene sulfide (PPS), polyether ether ketone (PEEK), etc. The resilient layer 402 may be 1-25 microns thick in certain example embodiments. The conductor 404 may be formed from the same or different material as that used for conductor 306, in different example embodiments. Metal or metal oxide materials may be used, for example. In certain example embodiments, a 10-50 nm thick material including a layer comprising, for example, ITO, Al, Ni, NiCr, tin oxide, and/or the like, may be used. In certain example embodiments, the resistance of the conductor 404 may be in the range of 40-200 ohms/square.

The decorative ink 406 may include pigments, particles, and/or other materials that selectively reflect and/or absorb desired visible colors and/or infrared radiation.

As FIG. 2 shows, the shades 202a and 202b ordinarily are coiled as spiral rolls, with an outer end of the spiral affixed by an adhesive to the substrates 102 and 104 (e.g., or the dielectric thereon). The conductor 404 may be electrically connected via a terminal to a lead or the like and may serve as a variable electrode of a capacitor having the conductor 306 as its fixed electrode and the dielectric 308 as its dielectric.

When an electrical drive is provided between the variable electrode and the fixed electrode, e.g., when an electric drive of voltage or current is applied between the conductor 404 of the shutter 312 and the conductor 306 on the substrate 302, the shutter 312 is pulled toward the substrate 302 via an electrostatic force created by the potential difference between the two electrodes. The pull on the variable electrode causes the coiled shade to roll out. The electrostatic force on the variable electrode causes the shutter 312 to be held securely against the fixed electrode of the substrate 302. As a result, the ink coating layer 406 of the shade selectively reflects or absorbs certain visible colors and/or infrared radiation. In this way, the rolled-out shade helps control radiation transmission by selectively blocking and/or reflecting certain light or other radiation from passing through the IG unit, and thereby changes the overall function of the IG unit from being transmissive to being partially or selectively transmissive, or even opaque in some instances.

When the electrical drive between the variable electrode and the fixed electrode is removed, the electrostatic force on the variable electrode is likewise removed. The spring constant present in the resilient layer 402 and the conductor 404 causes the shade to roll up back to its original, tightly-wound position. Because movement of the shade is controlled by a primarily capacitive circuit, current essentially only flows while the shade is either rolling out or rolling up. As a result, the average power consumption of the shade is extremely low. In this way, several standard AA batteries may be used to operate the shade for years, at least in some instances.

In one example, the substrate 302 may be 3 mm thick clear glass commercially available from the assignee. An acrylic-based adhesive having a low haze may be used for adhesive layer 310. Sputtered ITO having a resistance of 100-300 ohms/square may be used for the conductor 306. The polymer film may be a low-haze (e.g., <1% haze) PET material that is 12 microns thick. A PVC-based ink available from Sun Chemical Inc. applied to 3-8 microns thickness may be used as the decorative ink 406. A PEN material commercially available from DuPont that is 6, 12, or 25 microns thick may be used as the resilient layer 402. For an opaque conductor 406, evaporated Al that has a nominal thickness of 375 nm may be used. For a transparent option, sputtered ITO may be used. In both cases, the resistance may be 100-400 ohms/square. The ITO or other conductive material(s) may be sputtered onto, or otherwise formed on, their respective polymer carrier layers in certain example embodiments. Of course, these example materials, thicknesses, electrical properties, and their various combinations and sub-combinations, etc., should not be deemed limiting unless specifically claimed.

As will be appreciated from the description above, the dynamic shade mechanism uses a coiled polymer with a conductive layer. In certain example embodiments, the conductor 404 may be formed to be integral with the polymer 402, or it may be an extrinsic coating that is applied, deposited, or otherwise formed on the polymer 402. As also mentioned above, decorative ink 406 may be used together with a transparent conductor material (e.g., based on ITO) and/or an only partially transparent or opaque conductive layer. An opaque or only partially transparent conductive layer may obviate the need for ink in certain example embodiments. In this regard, a metal or substantially metallic material may be used in certain example embodiments. Aluminum is one example material that may be used with or without a decorative ink.

One or more overcoat layers may be provided on the conductor to help reduce the visible light reflection and/or change the color of the shade to provide a more aesthetically pleasing product, and/or by "splitting" the conductor so that a phase shifter layer appears therebetween. Overcoats thus may be included to improve the aesthetic appearance of the overall shade. The shutter 312 thus may include a reflection-reducing overcoat, dielectric mirror overcoat, or the like. Such reflection-reducing overcoats and dielectric mirror overcoats may be provided over a conductor 404 and on a major surface of the shade polymer 402 comprising (for example) PEN opposite decorative ink 406. It will be appreciated, however, that the ink 406 need not be provided, e.g., if the conductor 404 is not transparent. Mirror coatings such as, for example, Al, may obviate the need for decorative ink 406. It also will be appreciated that the reflection-reducing overcoat and the dielectric mirror overcoat may be provided on major surfaces of the shade polymer 402 comprising (for example) PEN opposite the conductor 404 in certain example embodiments.

In addition to or in place of using optical interference techniques to reduce reflection, it also is possible to add a textured surface to the base polymer, modifying the conductive layer chemically or physically, and/or add an ink layer, e.g., to accomplish the same or similar ends, achieve further reductions in unwanted reflection, etc.

Given that the thin film and/or other materials comprising the shutter should survive numerous rolling and unrolling operations in accordance with the functioning of the overall shade, it will be appreciated that the materials may be selected, and that the overall layer stack formed, to have mechanical and/or other properties that facilitate the same. For example, an excess of stress in a thin film layer stack typically is seen as disadvantageous. However, in some instances, excess stress can lead to cracking, "delamination"/removal, and/or other damage to the conductor 404 and/or an overcoat layer or layers formed thereon. Thus, low stress (and in particular low tensile stress) may be particularly desirable in connection with the layer(s) formed on the shutters' polymer bases in certain example embodiments.

In this regard, the adhesion of sputtered thin films depends on, among other things, the stress in the depositing film. One way stress can be adjusted is with deposition pressure. Stress versus sputter pressure does not follow a monotonic curve but instead inflects at a transition pressure that in essence is unique for each material and is a function of the ratio of the material's melting temperature to the substrate temperature. Stress engineering can be accomplished via gas pressure optimizations, bearing these guideposts in mind.

Other physical and mechanical properties of the shade that may be taken into account include the elastic modulus of the polymer and the layers formed thereon, the density ratio of the layers (which may have an effect on stress/strain), etc. These properties may be balanced with their effects on internal reflection, conductivity, and/or the like.

As is known, temperatures internal to an IG unit may become quite elevated. For example, it has been observed that an IG unit in accordance with the FIG. 2 example and including a black pigment may reach a temperature of 87 degrees C., e.g., if the black portion of the shade is facing the sun in elevated temperature, high solar radiation climates (such as, for example, in areas of the southwest United States such as Arizona). The use of a PEN material for the rollable/unrollable polymer may be advantageous, as PEN has a higher glass transition temperature (~120 degrees C.), compared to other common polymers such as PET (Tg=67-81 degrees C.), Poly Propylene or PP (Tg=~32 degrees C.). Yet if the PEN is exposed to temperatures approaching the glass transition temperature, the performance of the material's otherwise advantageous mechanical properties (including its elastic modulus, yield strength, tensile strength, stress relaxation modulus, etc.) may degrade overtime, especially with elevated temperature exposure. If these mechanical properties degrade significantly, the shade may no longer function (e.g., the shade will not retract).

In order to help the shade better withstand elevated temperature environments, a substitution from PEN to polymers with better elevated temperature resistance may be advantageous. Two potential polymers include PEEK and Polyimide (PI or Kapton). PEEK has a Tg of ~142 degrees C. and Kapton HN has a Tg of ~380 degrees C. Both of these materials have better mechanical properties in elevated temperature environments, compared to PEN. This is especially true at temperature above 100 degrees C. The following chart demonstrates this, referencing mechanical properties of PEN (Teonex), PEEK, and PI (Kapton HN). UTS stands for ultimate tensile strength, in the chart.

|  |  | PEN | PEEK | PI |
|---|---|---|---|---|
| 25 degrees C. | UTS (psi) | 39,000 | 16,000 | 33,500 |
|  | Modulus (psi) | 880,000 | 520,000 | 370,000 |
|  | Yield (psi) | 17,500 |  | 10,000 |
| 200 degrees C. | UTS (psi) | 13,000 | 8,000 | 20,000 |
|  | Modulus (psi) |  |  | 290,000 |
|  | Yield (psi) | <1,000 |  | 6,000 |
| Tg |  | ~121 degrees C. | ~143 degrees C. | ~380 degrees C. |

It will be appreciated that the modification of the shade base material from its current material (PEN) to an alternate polymer (e.g., PEEK or PI/Kapton) that has increased elevated temperature mechanical properties may be advantageous in the sense that it may enable the shade to better withstand internal IG temperatures, especially if the shade is installed in higher temperature climates. It will be appreciated that the use of an alternative polymer may be used in connection with the shutter and/or the on-glass layer in certain example embodiments.

In addition, or as an alternative, certain example embodiments may use a dyed polymer material. For example, a dyed PEN, PEEK, PI/Kapton, or other polymer may be used to created shades with an assortment of colors and/or aesthetics. For instance, dyed polymers may be advantageous for embodiments in transparent/translucent applications, e.g., where the shade conductive layer is a transparent conductive coating or the like.

Alternate conductive materials that beneficially modify the spring force of the coiled shade to make it usable for various lengths may be used. In this regard, properties of the conductive layer that increase the strength of the coil include an increase in the elastic modulus, an increase in the difference in coefficient of thermal expansion (CTE) between the polymer substrate and the conductive layer, and an increase in the elastic modulus to density ratio. Some of the pure metals that can be used to increase coil strength compared to Al or Cr include Ni, W, Mo, Ti, and Ta. The elastic modulus of studied metal layers ranged from 70 GPa for Al to 330 GPa for Mo. The CTE of studied metal layers ranged from $23.5 \times 10^{-6}$/k for Al down to $4.8 \times 10^{-6}$/k for Mo. In general, the higher the elastic modulus, the higher the CTE mismatch between the PEN or other polymer and the metal, the lower the density, etc., the better the material selection in terms of coil formation. It has been found that incorporating Mo and Ti based conductive layers into shades has resulted in a spring force of the coil that is significantly higher than that which is achievable with Al. For example, a polymer substrate based on PEN, PEEK, PI, or the like, may support (in order moving away from the substrate) a layer comprising Al followed by a layer comprising Mo. Thin film layer(s) in a conductive coating and/or a conductive coating itself with a greater modulus and lower CTE than Al may be provided.

A PEN, PI, or other polymer substrate used as a shutter may support a thin layer comprising Al for stress-engineering purposes, with a conductive layer comprising Mo, Ti, or the like directly or indirectly thereon. The conductive layer may support a corrosion-resistant layer comprising Al, Ti, stainless steel, or the like. The side of the substrate opposite these layers optionally may support a decorative ink or the like.

Certain example embodiments may include microscopic perforations or through-holes that allow light to pass through the shade and provide progressive amounts of solar transmittance based on the angle of the sun.

Further manufacturing, operation, and/or other details and alternatives may be implemented. See, for example, U.S. Pat. Nos. 8,982,441; 8,736,938; 8,134,112; 8,035,075; 7,705,826; and 7,645,977, as well as U.S. Publication No. 2020/0011120; the entire contents of each of which is hereby incorporated herein by reference. Additionally, or in the alternative, electrostatic forces can be used to cause retraction of the shade in certain example embodiments. In this regard, see U.S. application Ser. No. 16/779,927 filed on Feb. 3, 2020, the entire contents of which are hereby incorporated herein by reference. Among other things, perforation configurations, polymer materials, conductive coating designs, stress engineering concepts, building-integrated photovoltaic (BIPV), and other details are disclosed therein and at least those teachings may be incorporated into certain example embodiments.

The dynamic widow shade controller of certain example embodiments incorporates a flyback transformer. The flyback transformer produces high voltage DC output to drive a window shade from a low voltage DC source (voltage step-up), recovers energy from the window shade, and provides a signal that is proportional to the shade voltage on the primary transformer winding, which is useful for low power voltage measurement.

Some photoflash charger controllers, such as the LT3484 photoflash charger, use flyback transformers. The LT3484, for example, senses the high voltage output by measuring the amplitude of the flyback voltage pulse that appears across the primary transformer winding when current flows in the secondary winding. Measuring the output voltage from the input side has the advantage of reduced power dissipation. Compared to measurement of the high voltage by resistive techniques, this approach consumes much less power (resistive power losses which are proportional to voltage squared) for brief periods of time (resistive dividers on the output require continuous power draw). Primary side voltage measurements also can maintain galvanic isolation provided by separate primary and secondary transformer windings. In certain example embodiments, a circuit may sense the high voltage output by measuring the current that appears on the primary transformer winding circuit when current flows in the secondary winding.

The conventional usage for a flyback transformer is to convert low voltage DC to higher voltage DC. In this regard, current is fed through the primary winding. With constant DC input voltage, the current ramps up linearly, storing magnetic energy in the flyback transformer core (as with any inductor). Then, primary current is interrupted. This causes current to flow in the secondary winding (the flyback pulse). During the flyback pulse, a voltage appears across the primary winding, which is proportional to the secondary voltage.

Because the flyback transformer stores magnetic energy in the magnetic core, the ratio of input to output voltage is not fixed by the transformer turns ratio. Instead, the voltage is transformed in an independent ratio. This enables efficient charging to an output with arbitrary voltage from a DC source with fixed input voltage. Dynamic window shades according to certain example embodiments use variable voltage output while the shade is in motion and/or to hold it in intermediate positions between fully extended and fully retracted. In this sense, then, flyback transformers can be useful in voltage step-up and low power voltage measurement in dynamic shade related applications, as noted above.

The window shade controller of certain example embodiments discharges the energy stored in the shade (to reduce the shade voltage) to cause a shade to retract. It is possible to have the power simply "dumped" into a resistor or a resistive constant-current source based on transistors. However, the stored energy is available for recovery and reuse. Incorporating a flyback transformer may be helpful in providing energy recovery in certain example embodiments.

Figure 5:
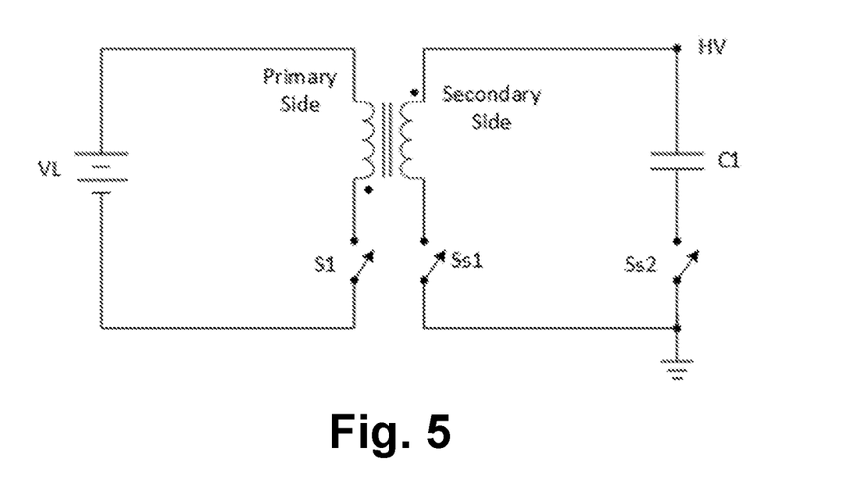
FIG. 5 is a schematic view of a conventional flyback power supply with active switches on the primary and secondary sides.

FIG. 5 is a schematic view of a conventional flyback power supply with active switches on the primary and secondary sides. A conventional flyback power supply intended for unidirectional power flow such as that shown in FIG. 5 uses actively controlled switches on the low voltage (primary) windings and passive switches (diodes) on the high voltage (output). The flyback power supply may provide an output voltage HV across capacitor C1, which may represent shade capacitance in certain example embodiments.

To achieve reverse power flow and energy reuse, the diodes are replaced with active high voltage switches Ss1, Ss2. The switching sequence is reversed. First, energy conversion begins by closing both secondary switches Ss1, Ss2 simultaneously. The secondary current begins to ramp up as the shade capacitance discharges. At this time, a voltage appears on the primary side that is proportional to the secondary voltage divided by the transformer turns ratio. Then the secondary switches Ss1, Ss2 open and the primary switch 51 closes. Current flows into the voltage source VL returning the stored energy to the primary side.

Conventional flyback power supplies produce voltage output in only one polarity. Window shades require output in two polarities according to certain example embodiments. The primary side of a flyback power supply can be driven with a full-bridge circuit to provide the two polarities for the window shades.

Figure 6:
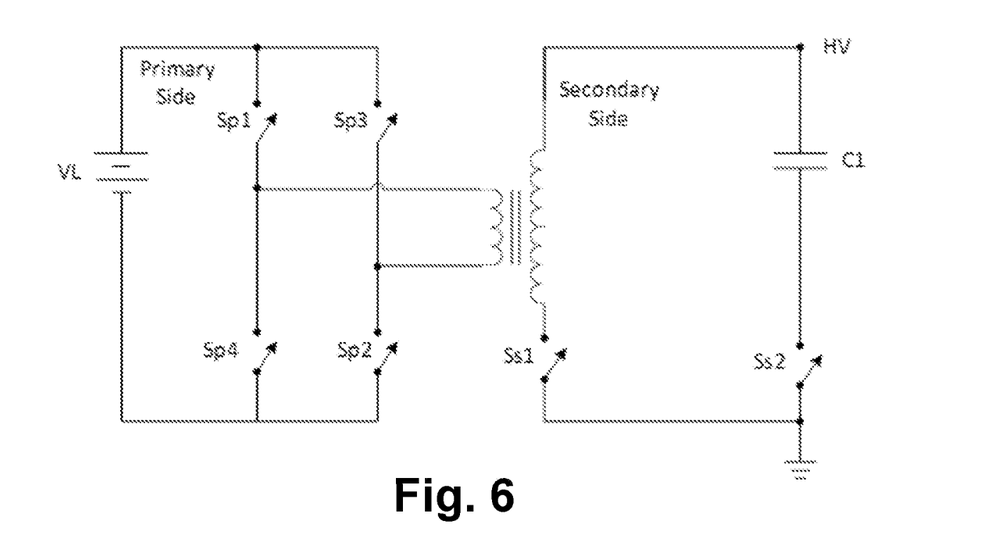
FIG. 6 is a schematic view of flyback controller with full-bridge input, which may be used in connection with certain example embodiments.

FIG. 6 is a schematic view of flyback controller with full-bridge input, which may be used in connection with certain example embodiments. The flyback controller includes a primary circuit provided on a primary side of the transformer and a secondary circuitry on a secondary side of the transformer.

The flyback controller with full-bridge input can be used to provide power with two polarities to a load. The primary side switches Sp1, Sp2, Sp3, and Sp4 may be controlled in pairs to provide the different polarities to the load and receive energy from the load during energy reuse. The energy may be provided from a voltage source VL (e.g., a battery, a DC power source, and/or an AC power source) providing low voltage and the voltage source may be recharged during the energy reuse cycle. In certain example embodiments, a USB connection may be provided to supply power to a rechargeable battery, to provide control instructions, and/or the like.

As shown in FIG. 6, primary switches Sp1 and Sp4 are coupled to one end of the transformer and primary switches Sp2 and Sp3 are coupled to another end of the transformer. In operation, the primary switches Sp1 and Sp2 are closed and primary switches Sp3 and Sp4 are open to provide a first polarity, and switches Sp1 and Sp2 are open and primary switches Sp3 and Sp4 are closed to provide a second polarity. Secondary switches Ss1 and Ss2 on the secondary side of the transformer are controlled to provide power to the shade(s) and to control the discharge of the shade capacitance.

To achieve reverse power flow and energy reuse, the secondary switches Ss1 and Ss2 are closed. The secondary current begins to ramp up as the shade capacitance discharges. As the shade capacitance discharges, a voltage appears on the primary side that is proportional to the secondary voltage. The primary switches Sp1, Sp2, Sp3 and Sp4 can be controlled in pairs to be closed or open based on the current flow generated in the primary side due to shade capacitance discharge on the secondary side.

As will be appreciated from the above, operation of the control circuitry include charging, discharging, and position sensing. Each will be discussed, in turn, below.

Charging includes the following in certain example embodiments. During charging, the shade is partially extended, and the output voltage HV typically is several hundred volts. One switch 51 (shown in FIG. 5) or pair of primary switches (e.g., Sp1 and Sp2 or Sp3 and Sp4 shown in FIG. 6) on the primary side is closed. Primary current increases in a linear ramp. When the appropriate primary current is achieved, the primary switch pair is opened and both secondary switches Ss1 and Ss2 are closed. Current in the secondary winding and output circuit immediately jumps to a high value. At this time, the voltage on the primary circuit reflects the output voltage (divided by the turns ratio) and can be measured to sense the output voltage HV. Current in the secondary circuit flows in a declining ramp to zero. When the current reaches zero, the secondary switches Ss1 and Ss2 are opened. The cycle can be repeated as necessary to continue energy transfer from input to output. Alternatively, the switches can commutate at non-zero values to maintain higher average charging current and power flow.

Discharging includes the following in certain example embodiments. To reduce the output voltage HV, the charging process is reversed. Both secondary switches Ss1 and Ss2 are closed. Secondary current in the secondary circuit ramps up as the load is discharged. When the secondary current reaches the appropriate value, the secondary switches Ss1 and Ss2 are opened, and the primary switch pair is closed. Primary current in the primary circuit then flows from the input to the voltage source VL. When the primary current reaches zero, the primary switch or primary switch pair is opened. Alternatively, the switches can commutate at non-zero values to maintain higher average discharge current and power flow.

Position sensing includes the following in certain example embodiments. The shade position is assumed to be proportional to its capacitance. To sense capacitance, the following relation is used: C=Q/V (where C is capacitance, Q is the charge held by the conductor, and V is the electric potential). This is equivalent to C=dQ/dV. The voltage can be estimated by measuring the amplitude of the flyback pulse. Charge can be estimated by integrating current flow. From these measurements, it may be possible to estimate the shade position and to use the position estimate for closed loop control for shade position, speed, and acceleration.

A flyback controller benefits from very precise switch timing. If the switch timing is imprecise, it is possible for excessive current flow that causes transformer core saturation, or for excessive voltage to appear across closed switches. During core saturation, the transformer impedance drops drastically, which can cause a runaway current spike. This may cause extensive damage to the switches and attached controller circuitry. Excessive switch voltage may damage switches. Because switch timing depends on high and low current thresholds, accurate current monitoring is beneficial. In the case of faulty current monitoring, a backup may be implemented with fuses so the controller may fault due to excessive switch on-time. Digital control of switch timing additionally or alternatively may be implemented in certain example embodiments to help address some or all of these issues.

Negative voltage pulses can appear on the inactive winding of the split primary in some instances. Negative voltage pulses can cause current flow in any switch that has an intrinsic body diode, such as MOSFET transistors. However, in certain example embodiments, a solid-state relay may be used to disable the inactive winding circuit.

As the switches feeding the input will have intrinsic diodes, the potential at either winding terminal should not exceed the supply voltage. In certain example embodiments, a full-bridge input circuit as shown in FIG. 5 using an input with sufficiently high voltage may be used. For a transformer with a turn ratio of 1:22 and an output of 700 V, for example, the supply should be greater than about 32 V. Because this may be considerably higher than the 5 V input typical for some window shade controllers, one or more additional voltage boosting converter stages may be implemented in certain example embodiments.

Figure 7:
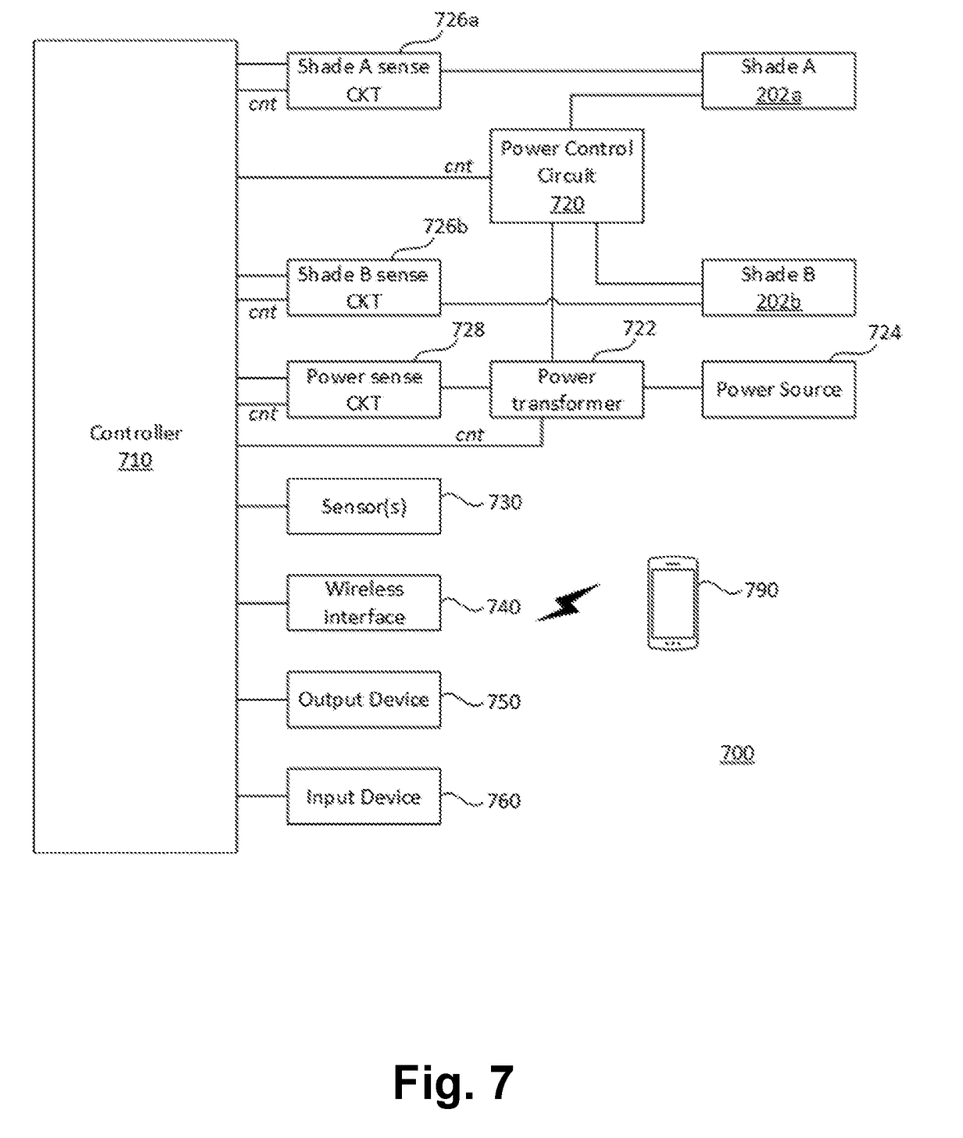
FIG. 7 shows a system diagram for controlling one or more shades that may be used with IG units in accordance with certain example embodiments.

FIG. 7 shows a system diagram for controlling one or more shades that may be used with IG units in accordance with certain example embodiments. The system 700 includes an electronic controller 710 configured to control operation of one or more shades. The electronic controller 710 may include a processor operably coupled to a memory storing instructions for receiving and decoding control signals that, in turn, cause voltage to be selectively applied to control the extension and/or retraction of the shade(s).

The electronic controller 710 may control operation of a power control circuit 720 coupled to the shades 202a and 202b to selectively provide voltage to the shades 202a and 202b. The power control circuit 720 may be coupled to a power transformer 722 configured to provide high voltage DC output to drive the shade(s) from a low voltage power source 724. The low voltage power source 724 may be an external AC or DC power supply and/or a battery. In some examples, the power transformer 722 may comprise a flyback power supply, such as the flyback power supplies discussed with reference to FIG. 5 and/or FIG. 6. Operation of the power transformer 722 may be controlled by the controller 710 and/or other circuits.

Figure 8:
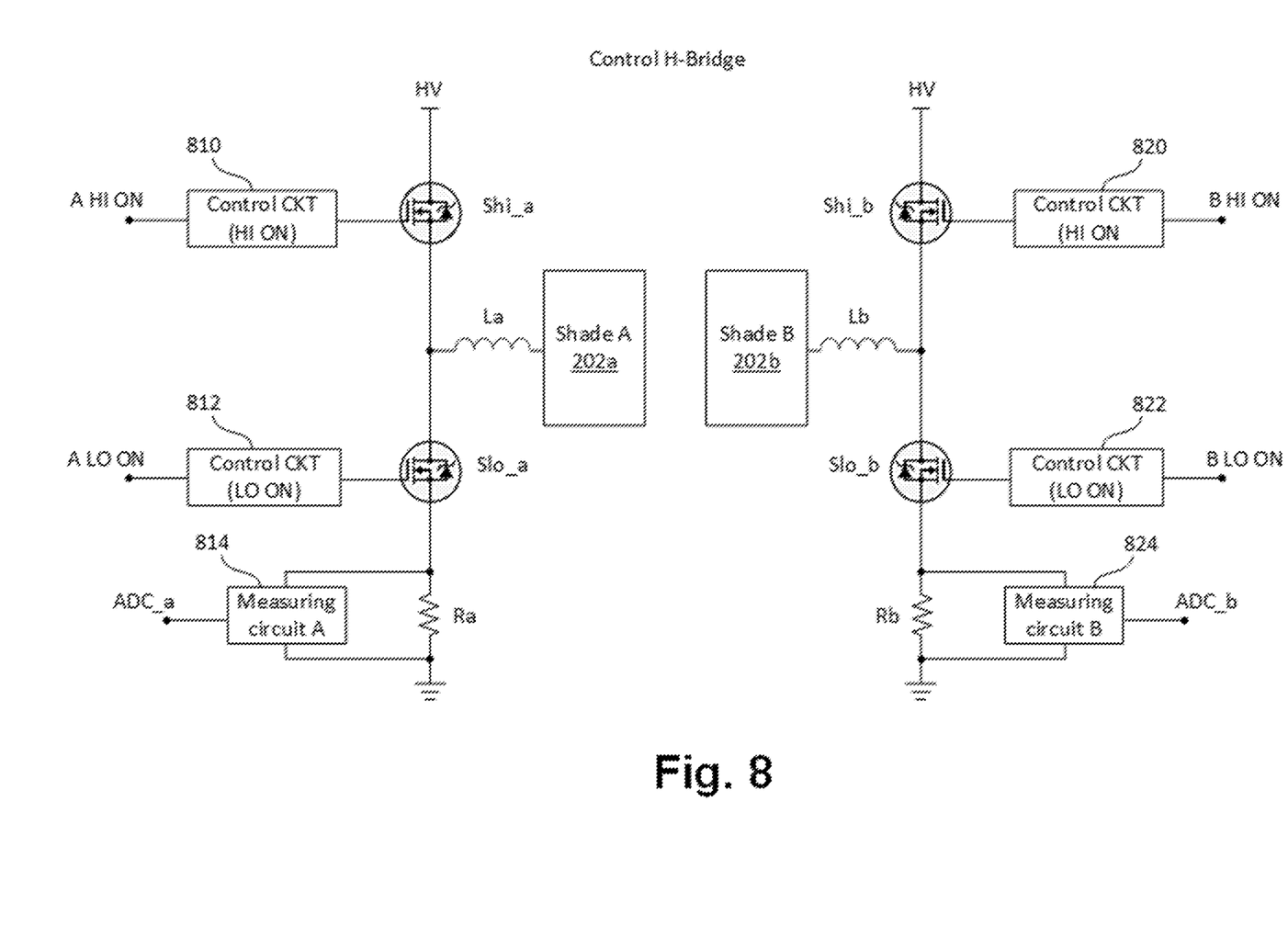
FIG. 8 shows an example of an H-Bridge control circuit according to certain example embodiments.

The power control circuit 720 may include an H-Bridge control circuit. FIG. 8 shows an example of an H-Bridge control circuit 800 according to certain example embodiments. In the H-Bridge control circuit 800, shade A 202a is coupled to a first pair of switches Shi_a and Slo_a, each of which may be a transistor, such as an N-channel MOSFET. Shade B 202b is coupled to a second pair of switches Shi_b and Slo_b, each of which may be a transistor, such as an N-channel MOSFET. The first pair of switches is controlled based on control signals (e.g., A HI ON, A LO ON) received from the controller 710 to charge and discharge shade A. The second pair of switches is controlled based on control signals (e.g., B HI ON, B LO ON) received from the controller 710 to charge and discharge shade B. It will be appreciated that each side of the H-Bridge may control the respective shade separately/independently in certain example embodiments.

As shown in FIG. 8, a control circuit 810 may be coupled to switch Shi_a to control operation of the switch Shi_a based on received signal A HI ON, to charge the shade A 202a. The control circuit 810 may be a transistor driver (e.g., FET driver circuit). A control circuit 812 may be coupled to switch Slo_a to control operation of the switch Slo_a based on received signal A LO ON, to discharge the shade A 202a. The control circuit 812 may be a transistor driver (e.g., gate driver circuit).

A control circuit 820 may be coupled to switch Shi_b to control operation of the switch Shi_b based on received signal B HI ON, to charge the shade B 202b. The control circuit 820 may be a transistor driver (e.g., FET driver circuit). A control circuit 822 may be coupled to switch Slo_b to control operation of the switch Slo_b based on received signal B LO ON, to discharge the shade B 202b. The control circuit 822 may be a transistor driver (e.g., gate driver circuit).

As shown in FIG. 8, a measuring circuit 814 may be coupled to the control circuit for shade A 202a to measure one or more parameters (e.g., voltage and/or current) of the shade A control circuit. The measuring circuit 814 may provide a digital signal to the controller 710 corresponding to a parameter value of the shade A control circuit. A measuring circuit 824 may be coupled to the control circuit for shade B 202b to measure one or more parameters (e.g., voltage and/or current) of the shade B control circuit. The measuring circuit 824 may provide a digital signal to the controller 710 corresponding to a parameter value of the shade B control circuit. While the measuring circuits 814 and 824 are shown coupled in parallel to resistors Ra and Rb coupled between switches Slo_a and Slo_b, respectively, the measuring circuits 814 and 824 may be provided in other locations of the control H-Bridge. The controller 710 may control operation of the switches in the control H-Bridge and/or power transformer 722 based on the signals received from measuring circuits 814 and/or 824.

In certain example embodiments, the power transformer 722 may include a flyback transformer (e.g., a transformer as shown in FIG. 5 or FIG. 6) and the power control circuit 720 may include an H-Bridge control circuit (e.g., an H-Bridge control circuit 800 as shown in FIG. 8). In this example, both of the flyback transformer and the H-Bridge control circuit may be controlled to charge and discharge the capacitance of one or more shades. To discharge the shade capacitance, the H-Bridge may be controlled to discharge the shade capacitance by coupling the shade to ground via switch Slo_a or Slo_b or the flyback transformer may be controlled to recovery the stored energy.

The power transformer 722 is not limited to including a flyback transformer and may include other types of boosting transformers configured to generate high voltage, with or without polarity inverting capabilities and/or with or without ability to charge a power source. In certain example embodiments, the power transformer 722 may include one or more of electromagnetic transformer and/or electromechanical transformer (e.g., a piezo transformer).

The power control circuit 720 is not limited to including an H-Bridge control circuit and may include other types of power control circuits configured to charge and discharge shade capacitance, with or without polarity inverting. In certain example embodiments, the power transformer 722 may include other types of polarity inverting circuits, such as, for example, a circuit including a double pole double throw switch to provide polarity inverting.

In certain example embodiments, the H-Bridge control circuit 800 may be controlled to charge and discharge the capacitance of one or more shades without the system including a flyback transformer. In this example, a conventional transformer may be used to provide high voltage or the high voltage may be provided by the power source 724. In another example, the flyback transformer may be controlled to charge and discharge the capacitance of one or more shades without the system including H-Bridge control circuit. In this example, the flyback transformer may be configured to produce two polarities.

The controller 710 may also receive signals from one or more sensors 730 which include a temperature sensor (e.g., a thermistor) configured to measure inside temperature, outside temperature, and/or temperature between the first and second substrates 102 and 104, light sensor configured to measure inside temperature, outside temperature, and/or light between the first and second substrates 102 and 104, shade positioning sensor, and/or a proximity sensor. In some examples, the sensor may be disposed between the first and second substrates 102 and 104. The controller 710 may control operation of the power control circuit 720 and/or power transformer 722 based on the signals received from one or more sensors 730.

The controller 710 also may receive signals from a shade A sense circuit 726a, shade B sense circuit 726b, and/or a power sense circuit 728. The circuit 726a, 726b and/or 728 may receive a control signal (e.g., a trigger to take measurements at predetermined timing) from the controller and provide a measure value (e.g., a digital signal) corresponding to a value measured by the corresponding circuit. The circuit 726a, 726b and/or 728 may convert a measured analog value to a digital value. The A sense circuit 726a may measure a parameter (e.g., a voltage or current) associated with operation of shade A 202a. The shade B sense circuit 726b may measure a parameter (e.g., a voltage or current) associated with operation of the shade B 202b. The power sense circuit 728 may measure power provided by the power transformer 722. In certain example embodiments, the power sense circuit 728 may provide a value representing a voltage or current value on the primary side of a transformer in the power transformer 722 or a value representing a voltage or current on a secondary side of the transformer in the power transformer 722. The controller 710 may control operation of the power control circuit 720 and/or power transformer 722 based on the signals received from circuit 726a, 726b and/or 728. The output from the power sense circuit 728 may be used to estimate position of shade.

The system 700 may provide information on the operating state of the system via a wireless interface 740 and/or output device 750. The information output via the wireless interface 740 and/or output device 750 may include operating state of the system 700, detected errors, position of the shades, measured temperature, measured light, etc. The output device 750 may include a digital display, one or more lights (e.g., LED lights), a speaker, and/or the like.

The system 700 may control operation of the shades based on the control information received via the wireless interface 740 and/or input device 760. The input device may include one or more buttons, a remote (e.g., a wireless or wired remote), a keyboard, a touch input (e.g., a touch input display), a microphone, and/or another input device. The control information may include user input instructions, pre-programmed instructions, sensor thresholds for controlling the shades, operating schedule, and/or calibration information.

The wireless interface 740 may be configured to receive and/or transmit information to one or more devices 790 and/or remotely executed applications. The devices 790 may include mobile devices (e.g., smart phones, tablets). The remotely executed applications may include an application executed on a computer or in a cloud. In certain example embodiments, the wireless interface 740 may include or be configured to interface with smart home interfaces such as a Z-WAVE, AMAZON ECHO, SAMSUNG SMARTTHINGS, APPLE TV, SAMSUNG CONNECT HOME, GOOGLE NEST devices, etc. The system 700 may control operation of the shades based on the signals received via the wireless interface 740.

Certain example embodiments may be used in generally vertical and/or generally horizontal configurations. In such cases, optional electrostatic forces may be used to hold the shutter against the substrate in certain example embodiments.

Although the FIG. 7 and FIG. 8 examples show circuitry configured to drive two shades, it will be appreciated that modifications can be made to drive just one shade, or to drive more than two shades in the case of, for example, a triple IG unit or the like with more than two shades.

The IG units described herein may incorporate low-E coatings on any one or more of surfaces 1, 2, 3, and 4. As noted above, for example, such low-E coatings may serve as the conductive layers for shades. In other example embodiments, in addition to or apart from serving and conductive layers for shades, a low-E coating may be provided on another interior surface. For instance, a low-E coating may be provided on surface 2, and a shade may be provided with respect to surface 3. In another example, the location of the shade and the low-E coating may be reversed. In either case, a separate low-E coating may or may not be used to help operate the shade provided with respect to surface three. In certain example embodiments, the low-E coatings provided on surfaces 2 and 3 may be silver-based low-E coatings. Example low-E coatings are set forth in U.S. Pat. Nos. 9,802,860; 8,557,391; 7,998,320; 7,771,830; 7,198,851; 7,189,458; 7,056,588; and 6,887,575; the entire contents of each of which is hereby incorporated by reference. Low-E coatings based on ITO and/or the like may be used for interior surfaces and/or exterior surfaces. See, for example, U.S. Pat. Nos. 9,695,085 and 9,670,092; the entire contents of each of which is hereby incorporated by reference. These low-E coatings may be used in connection with certain example embodiments.

Antireflective coatings may be provided on major surfaces of the IG unit, as well. In certain example embodiments, an AR coating may be provided on each major surface on which a low-E coating and shade is not provided. Example AR coatings are described in, for example, U.S.

Pat. Nos. 9,796,619 and 8,668,990 as well as U.S. Publication No. 2014/0272314; the entire contents of each of which is hereby incorporated by reference. See also U.S. Pat. No. 9,556,066, the entire contents of which is hereby incorporated by reference herein. These AR coatings may be used in connection with certain example embodiments.

The example embodiments described herein may be incorporated into a wide variety of applications including, for example, interior and exterior windows for commercial and/or residential application, skylights, doors, merchandizers such as refrigerators/freezers (e.g., for the doors and/or "walls" thereof), vehicle applications, etc.

Although certain example embodiments have been described in connection with IG units including two substrates, it will be appreciated that the techniques described herein may be applied with respect to so-called triple-IG units. In such units, first, second, and third substantially parallel spaced apart substrates are separated by first and second spacer systems, and shades may be provided adjacent to any one or more of the interior surfaces of the innermost and outermost substrates, and/or to one or both of the surfaces of the middle substrate. Similarly, the example embodiments described herein may be used in connection with other window assemblies such as, for example, vacuum insulating glass (VIG) units, laminated products, etc.

Although certain example embodiments have been described as incorporating glass substrates (e.g., for use of the inner and outer panes of the IG units described herein), it will be appreciated that other example embodiments may incorporate a non-glass substrate for one or both of such panes. Plastics, composite materials, and/or the like may be used, for example. When glass substrates are used, such substrates may be heat treated (e.g., heat strengthened and/or thermally tempered), chemically tempered, left in the annealed state, etc. In certain example embodiments, the inner or outer substrate may be laminated to another substrate of the same or different material.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, an insulating glass (IG) unit is provided. First and second substrates each have interior and exterior major surfaces, the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates, the shade including: a first conductive layer provided, directly or indirectly, on the interior major surface of the first substrate; and a shutter including at least one polymer substrate, first and second conductive coatings, and first and second dielectric layers. The at least one polymer substrate is extendible to a shutter closed position and retractable to a shutter open position. A control circuit includes a boosting transformer coupled to a power source and the shade, the boosting transformer being controllable to produce a voltage for charging the shade and to discharge accumulated shade capacitance.

In certain example embodiments, there is provided a method of controlling a shade, the method comprising: having an insulating glass (IG) unit. The IG unit comprises first and second substrates, each having interior and exterior major surfaces, the interior major surface of the first substrate facing the interior major surface of the second substrate; and a spacer system helping to maintain the first and second substrates in substantially parallel spaced apart relation to one another and to define a gap therebetween. The shade is dynamically controllable and interposed between the first and second substrates, with the shade including: a first conductive layer provided, directly or indirectly, on the interior major surface of the first substrate; and a shutter including at least one polymer substrate, first and second conductive coatings, and first and second dielectric layers. The at least one polymer substrate is extendible to a shutter closed position and retractable to a shutter open position. The IG unit also includes a control circuit including a boosting transformer coupled to a power source and the shade, with the boosting transformer being controllable to produce a voltage for charging the shade and to discharge accumulated shade capacitance. Electrostatic forces are created via the control circuit to drive the shade to the shutter closed position.

In addition to the features of either of the two previous paragraphs, in certain example embodiments, the first and/or second conductive coatings may be electrically connectable to the control circuit, e.g., with the control circuit being configured to set up an electric potential difference to create electrostatic forces to drive the at least one polymer substrate to the shutter closed position.

In addition to the features of the previous paragraph, in certain example embodiments, the first and/or second conductive coatings may be electrically connectable to the control circuit configured to set up another electric potential difference to create electrostatic forces to drive the at least one polymer substrate to the shutter open position.

In addition to the features of any of the four previous paragraphs, in certain example embodiments, the control circuit may include a wireless interface configured to wirelessly receive instructions for controlling the shade from an external device, and the external device, and transformer may be controllable based on the received instructions.

In addition to the features of any of the five previous paragraphs, in certain example embodiments, the boosting transformer may be configured to charge the power source during discharging of the accumulated shade capacitance.

In addition to the features of any of the six previous paragraphs, in certain example embodiments, the boosting transformer may be a flyback transformer.

In addition to the features of any of the seven previous paragraphs, in certain example embodiments, the flyback transformer may be controllable to produce two polarities.

In addition to the features of any of the eight previous paragraphs, in certain example embodiments, a primary side of the flyback transformer may comprise a full-bridge circuit including two pairs of switches coupled between the power source and a primary winding of the flyback transformer, e.g., with the two pairs of switches being controllable to selectively provide voltage with a first polarity or a second polarity.

In addition to the features of any of the nine previous paragraphs, in certain example embodiments, the control circuit may include an H-Bridge circuit coupled between an output of the boosting transformer and the shade.

In addition to the features of the previous paragraph, in certain example embodiments, the H-Bridge circuit may include a first N-channel MOSFET controllable to couple the output of the boosting transformer to the shade and a second N-channel MOSFET controllable to couple the shade to ground for discharging the accumulated shade capacitance.

In addition to the features of any of the 10 previous paragraphs, in certain example embodiments, the control circuit may include a polarity inverting circuit coupled between an output of the boosting transformer and the shade.

In addition to the features of any of the 11 previous paragraphs, in certain example embodiments, a sensor may be configured to measure temperature and/or light near the exterior major surface of the first substrate, near the exterior major surfaces of the second substrate, and/or between the first and second substrates, e.g., with the charging and discharging of the shade capacitance being controllable based on signals received from the sensor.

In addition to the features of any of the 12 previous paragraphs, in certain example embodiments, the boosting transformer may include a flyback transformer and the power source may include a battery and the control circuit may be configured to control the flyback transformer to charge the battery during discharge of the accumulated shade capacitance.

In addition to the features of any of the 13 previous paragraphs, in certain example embodiments, the boosting transformer may include a flyback transformer, the control circuit may include a sense circuit configured to measure flyback voltage pulse on the primary side of the flyback transformer caused by accumulated shade capacitance discharge, and the charging and discharging of the shade capacitance may be controllable based on the measured flyback voltage.

In addition to the features of any of the 14 previous paragraphs, in certain example embodiments, the boosting transformer may include a flyback transformer, the control circuit may include a sense circuit configured to measure flyback current on the primary side of the flyback transformer caused by accumulated shade capacitance discharge, and the charging and discharging of the shade capacitance may be controllable based on the measured flyback current.

While the invention has been described in connection with what is presently considered to be the most practical and preferred embodiment, it is to be understood that the invention is not to be limited to the disclosed embodiment and/or deposition techniques, but on the contrary, is intended to cover various modifications and equivalent arrangements included within the spirit and scope of the appended claims.

What is claimed is:

1. An insulating glass (IG) unit, comprising:
    first and second substrates, each having interior and exterior major surfaces, the interior major surface of the first substrate facing the interior major surface of the second substrate;
    a spacer system helping to maintain the first and second substrates in substantially parallel spaced apart relation to one another and to define a gap therebetween;
    a dynamically controllable shade interposed between the first and second substrates, the shade including:
    a first conductive layer provided, directly or indirectly, on the interior major surface of the first substrate; and
    a shutter including at least one polymer substrate, first and second conductive coatings, and first and second dielectric layers, wherein the at least one polymer substrate is extendible to a shutter closed position and retractable to a shutter open position;
    a power source; and
    a control circuit including a boosting transformer coupled to the power source and the shade,
    wherein the boosting transformer being controllable to produce a voltage for charging a shade capacitance to drive the shade towards the shutter closed position and to discharge accumulated shade capacitance to drive the shade towards the shutter open position, and
    wherein the boosting transformer is configured to charge the power source using the discharged accumulated shade capacitance.

2. The IG unit of claim 1, wherein the first and/or second conductive coatings are electrically connected to the control circuit, and
    wherein the charging of the shade capacitance via the boosting transformer sets up an electric potential difference between the first and second conductive coatings to create electrostatic forces to drive the at least one polymer substrate towards the shutter closed position.

3. The IG unit of claim 2, wherein the discharging of the accumulated shade capacitance via the boosting transformer sets up another electric potential difference to create electrostatic forces to drive the at least one polymer substrate towards the shutter open position.

4. The IG unit of claim 1, wherein the control circuit includes a wireless interface configured to wirelessly receive instructions for controlling the shade from an external device, and wherein the boosting transformer is controllable based on the received instructions.

5. The IG unit of claim 1, wherein the boosting transformer includes a flyback transformer and the control circuit includes a sense circuit configured to measure flyback voltage pulse and integrated current flow on a primary side of the flyback transformer caused by accumulated shade capacitance discharge, and wherein a position of the shade is determined via the control circuit from the measure flyback voltage pulse and integrated current flow.

6. The IG unit of claim 1, wherein the boosting transformer is a flyback transformer.

7. The IG unit of claim 6, wherein the flyback transformer is controllable to produce two polarities.

8. The IG unit of claim 6, wherein a primary side of the flyback transformer comprises a full-bridge circuit including two pairs of switches coupled between the power source and a primary winding of the flyback transformer, the two pairs of switches being controllable to selectively provide voltage with a first polarity or a second polarity.

9. The IG unit of claim 1, wherein the control circuit includes an H-Bridge circuit coupled between an output of the boosting transformer and the shade.

10. The IG unit of claim 9, wherein the H-Bridge circuit includes a first N-channel MOSFET controllable to couple the output of the boosting transformer to the shade and a second N-channel MOSFET controllable to couple the shade to ground for discharging the accumulated shade capacitance.

11. The IG unit of claim 1, wherein the control circuit includes a polarity inverting circuit coupled between an output of the boosting transformer and the shade.

12. The IG unit of claim 1, further comprising a sensor configured to measure temperature and/or light near the exterior major surface of the first substrate, near the exterior major surfaces of the second substrate, and/or between the first and second substrates,
    wherein the charging and discharging of the shade capacitance is controllable based on signals received from the sensor.

13. The IG unit of claim 1, wherein the boosting transformer includes a flyback transformer, wherein the power source includes a battery, and
wherein the control circuit is configured to control the flyback transformer to charge the battery using the discharged accumulated shade capacitance.

14. The IG unit of claim 1, wherein the boosting transformer includes a flyback transformer, the control circuit includes a sense circuit configured to measure flyback voltage pulse on a primary side of the flyback transformer caused by accumulated shade capacitance discharge, and the charging and discharging of the shade capacitance is controllable based on the measured flyback voltage.

15. The IG unit of claim 1, wherein the boosting transformer includes a flyback transformer, the control circuit includes a sense circuit configured to measure flyback current on a primary side of the flyback transformer caused by accumulated shade capacitance discharge, and the charging and discharging of the shade capacitance is controllable based on the measured flyback current.

16. A method of controlling a shade, the method comprising:
having an insulating glass (IG) unit, comprising:
first and second substrates, each having interior and exterior major surfaces, the interior major surface of the first substrate facing the interior major surface of the second substrate; and
a spacer system helping to maintain the first and second substrates in substantially parallel spaced apart relation to one another and to define a gap therebetween;
the shade being dynamically controllable and interposed between the first and second substrates, the shade including: a first conductive layer provided, directly or indirectly, on the interior major surface of the first substrate; and a shutter including at least one polymer substrate, first and second conductive coatings, and first and second dielectric layers, wherein the at least one polymer substrate is extendible to a shutter closed position and retractable to a shutter open position;
a power source including a battery; and
a control circuit including a boosting transformer coupled to the power source and the shade, wherein the boosting transformer being controllable to produce a voltage for charging a shade capacitance and to discharge an accumulated shade capacitance;
charging the shade capacitance to create electrostatic forces via the boosting transformer to drive the shade towards the shutter closed position; and
discharging the accumulated shade capacitance via the boosting transformer to charge the battery using the discharged accumulated shade capacitance.

17. The method of claim 16, further comprising: discharging the accumulated shade capacitance via the boosting transformer to drive the shade towards the shutter open position.

18. The method of claim 16, wherein the first and/or second conductive coatings are electrically connected to the control circuit, and
wherein the charging of the shade capacitance via the boosting transformer sets up an electric potential difference between the first and second conductive coatings to create electrostatic forces to drive the at least one polymer substrate towards the shutter closed position.

19. The method of claim 18, wherein the control circuit includes a wireless interface configured to wirelessly receive instructions for controlling the shade from an external device, and
wherein the method further comprises controlling the boosting transformer to charge and/or discharge the shade capacitance based on the received instructions.

20. The method of claim 16, wherein the boosting transformer is controllable to produce two polarities.

21. The method of claim 16, wherein the control circuit includes an H-Bridge circuit coupled between an output of the boosting transformer and the shade, the H-Bridge circuit includes a first N-channel MOSFET coupled between the output of the flyback transformer and the shade and a second N-channel MOSFET coupled between the shade and ground, and
wherein the method further comprises closing the first N-channel MOSFET to charge the shade capacitance and closing the second N-channel MOSFET to discharge the shade capacitance.

22. The method of claim 16, further comprising using a sensor to measure temperature and/or light near the exterior major surface of the first substrate, near the exterior major surfaces of the second substrate, and/or between the first and second substrates,
wherein the electrostatic force is controllable via the control circuit based on signals received from the sensor.

23. The method of claim 16, wherein the boosting transformer includes a flyback transformer and the control circuit includes a sense circuit configured to measure flyback voltage pulse on a primary side of the flyback transformer caused by accumulated shade capacitance discharge, and wherein the electrostatic force is controllable via the control circuit based on the measured flyback voltage.

24. The method of claim 16, wherein the boosting transformer includes a flyback transformer and the control circuit includes a sense circuit configured to measure flyback current pulse on a primary side of the flyback transformer caused by accumulated shade capacitance discharge, and wherein the electrostatic force is controllable via the control circuit based on the measured flyback current.

25. The method of claim 16, wherein boosting transformer is a flyback transformer.

26. The method of claim 16, wherein the boosting transformer includes a flyback transformer and the control circuit includes a sense circuit configured to measure flyback voltage pulse and integrated current flow on a primary side of the flyback transformer caused by accumulated shade capacitance discharge, and wherein a position of the shade is determined via the control circuit from the measure flyback voltage pulse and integrated current flow.

* * * * *